(12) United States Patent
Noguchi

(10) Patent No.: US 6,515,807 B2
(45) Date of Patent: Feb. 4, 2003

(54) LENS BARREL AND OPTICAL APPARATUS HAVING LENS BARREL

(75) Inventor: Kazuhiro Noguchi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/864,266

(22) Filed: May 25, 2001

(65) Prior Publication Data

US 2002/0012178 A1 Jan. 31, 2002

(30) Foreign Application Priority Data

May 30, 2000 (JP) ........................................ 2000-160943

(51) Int. Cl.⁷ ............................................... G02B 15/14
(52) U.S. Cl. ........................................ 359/694; 359/704
(58) Field of Search .............................. 359/694, 702, 359/703, 704

(56) References Cited

U.S. PATENT DOCUMENTS

| 4,998,809 A | 3/1991 | Tsuji et al. | .................. 350/500 |
| 5,453,606 A | 9/1995 | Hojo | ....................... 250/201.1 |

FOREIGN PATENT DOCUMENTS

| JP | 5-36410 | 5/1993 |
| JP | 6-265766 | 9/1994 |

*Primary Examiner*—Ricky Mack
(74) *Attorney, Agent, or Firm*—Fitzpatrick, Cella, Harper & Scinto

(57) ABSTRACT

A lens barrel is constructed by: a lens holding barrel holding a lens and having a first flange portion for preventing movement of the lens in the direction of an optical axis and permitting movement of the lens in a direction perpendicular to the optical axis and a ring-shaped guide surface; an intermediate ring having a wedge portion and movably provided on the guide surface of the lens holding barrel; and a supporting barrel supporting the lens holding barrel and having a second flange portion adapted to come into engagement with the first flange portion of the lens holding barrel and a wedge receiving portion which comes into contact with the wedge portion of the intermediate ring, in which the lens holding barrel is moved in the direction perpendicular to the optical axis for eccentricity adjustment, in a state where the lens holding barrel is moved, the intermediate ring is moved on the guide surface of the lens holding barrel, and the wedge portion comes into contact with the wedge receiving portion in this state, thereby fixing the lens holding barrel and the intermediate ring to the supporting barrel.

14 Claims, 4 Drawing Sheets

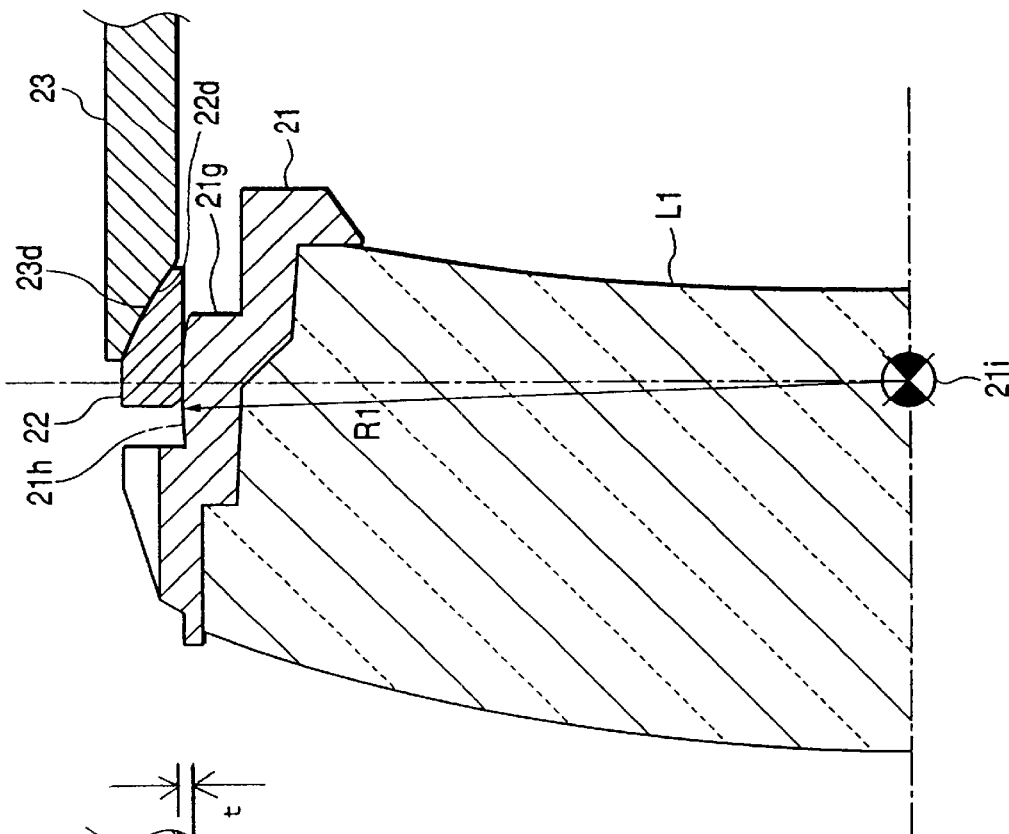
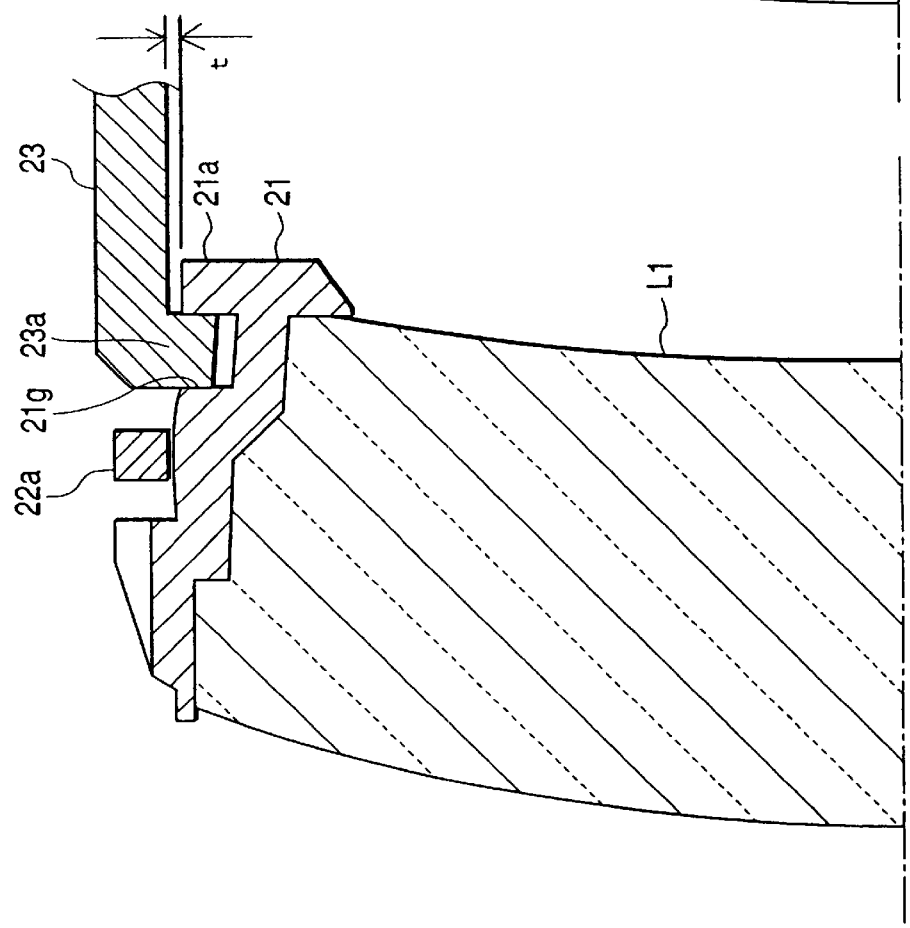

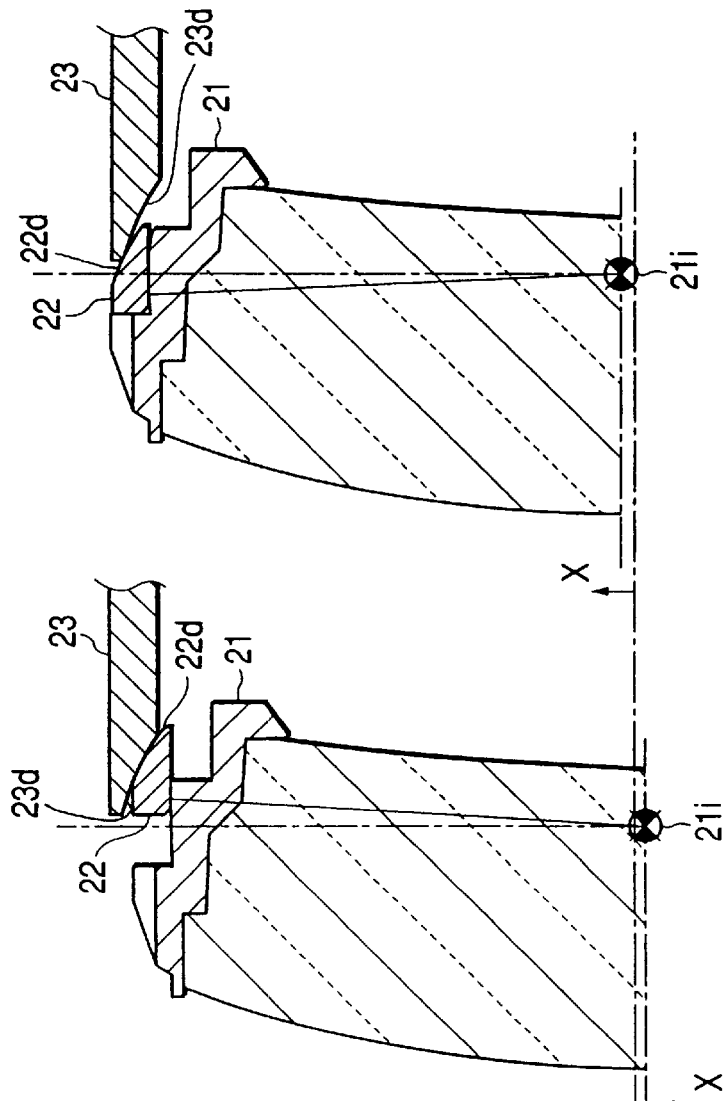

LENS BARREL AND OPTICAL APPARATUS HAVING LENS BARREL

BACKGROUND OF THE INVENTION

1. Field of the Invention

The invention relates to a lens barrel which is used in an optical apparatus such as a photographing apparatus, an observing apparatus, or the like and to an optical apparatus having the lens barrel.

2. Related Background Art

A lens barrel is assembled into optical apparatuses such as photographing apparatuses like a video camera, a digital still camera, and the like for fetching a motion image or a still image by using a solid state image pickup device such as a CCD or the like arranged on a focusing surface of an optical system, observing apparatuses like a binocular, an astronomical telescope, and the like for observing an image of an object obtained by the optical system with the naked eyes, and the like.

Hitherto, various eccentricity adjusting mechanisms and adjusting methods for a single lens or lens unit have been proposed for the purpose of realizing further miniaturization and higher performance for a lens barrel having a size or optical performance that can be accomplished on the basis of the shape precision in a single part of a lens or a mechanical part or on the basis of a combination precision of each part.

For example, in the lens barrel proposed in the Official Gazette of Japanese Utility Model Registration Laid-Open No. 5-36410, a proper rattle is provided between the outer peripheral surface of the lens and the inner peripheral surface of a lens holding member for holding it, and a plurality of adjusting screws are screwed into the lens holding member from the outer peripheral direction to thereby make the lens holding member come into contact with the lens, thereby making an eccentricity adjustment.

In JP-A-6-265766, the method whereby laser beams are caused to be passed through two lens systems and the resultant image formation is image-processed, so that an eccentricity adjustment is made by an adjusting tool, and a lens is adhered and fixed at an adjusted position has been proposed.

However, in the above conventional examples, the lens barrel proposed in the Official Gazette of Japanese Utility Model Registration Laid-Open No. 5-36410 has a problem such that since the eccentricity adjusting mechanism is assembled in the lens barrel, the size of the lens barrel increases in the radial direction. When the lens holding member is made of plastics, since it is necessary to design a hook of the screw so that it is longer than the lens holding member made of metal, the lens barrel becomes larger.

Moreover, since the lens is directly supported at a plurality of points, there are also problems such that the lens surface is deformed by the adjustment and, in the case of a heavy lens, the lens is broken by an impact load which is applied to the lens, or an adjusting position is shifted.

On the other hand, according to the method proposed in JP-A-6-265766, since the eccentricity adjustment is made by an adjusting tool which is externally attached, it is advantageous in terms of the size of the lens barrel. However, since the eccentricity adjusted lens is fixed only with the adhesive agent in both of the optical axial direction and the eccentricity adjusting direction, there is a problem such that softening or embrittlement of the adhesive agent, peel-off of the adhesive surface, or the like occurs in the case where an impact load is applied, due to a thermal and moist environment, or due to an external factor such as an abrupt temperature change or the like, so that the lens position is shifted.

SUMMARY OF THE INVENTION

It is an object of the invention to provide a lens barrel having an eccentricity adjusting mechanism having high positional reliability in a small space.

To accomplish the above object, according to the invention, there is provided a lens barrel comprising:

- a lens holding barrel which holds a lens and has a first flange portion for preventing movement of the lens in the direction of an optical axis and permitting movement of the lens in a direction perpendicular to the optical axis and a ring-shaped guide surface;
- an intermediate ring which is movably provided on the guide surface of the lens holding barrel and has a wedge portion; and
- a supporting barrel which supports the lens holding barrel and has a second flange portion adapted to be come into engagement with the first flange portion of the lens holding barrel and a wedge receiving portion which comes into contact with the wedge portion of the intermediate ring, in which the lens holding barrel is moved in a direction perpendicular to the optical axis for eccentricity adjustment, in a state where the lens holding barrel is moved, the intermediate ring is moved on the guide surface of the lens holding barrel, and the wedge portion comes into contact with the wedge receiving portion in this state, thereby fixing the lens holding barrel and the intermediate ring to the supporting barrel.

According to the invention, there is provided a lens barrel comprising:

- a lens holding barrel which holds a lens and has a first flange portion for preventing movement of the lens in the direction of an optical axis and permitting movement of the lens in a direction perpendicular to the optical axis and a ring-shaped guide surface;
- an intermediate ring which is movably provided on the guide surface of the lens holding barrel and has a wedge portion;
- a supporting barrel which supports the lens holding barrel and has a second flange portion adapted to be come into engagement with the first flange portion of the lens holding barrel and a wedge receiving portion which comes into contact with the wedge portion of the intermediate ring, in which the lens holding barrel is moved in the direction perpendicular to the optical axis for eccentricity adjustment, in a state where the lens holding barrel is moved, the intermediate ring is moved on the guide surface of the lens holding barrel, and the wedge portion comes into contact with the wedge receiving portion in this state, thereby fixing the lens holding barrel and the intermediate ring to the supporting barrel; and
- fixing means for fixing the lens holding barrel, the intermediate ring, and the supporting barrel.

According to the invention, there is further provided a lens barrel comprising:

- a lens holding barrel which holds a lens of a cylindrical shape, holds a lens and has at least three first flange portions for preventing movement of the lens in the direction of an optical axis and permitting movement of the lens in a direction perpendicular to the optical axis and a ring-shaped guide surface having a spherical surface;

an intermediate ring which is movably provided along the spherical surface of the guide surface of the lens holding barrel so that it can be freely inclined in the optical axial direction and to the optical axis, in which the intermediate ring has, on its inner peripheral surface, a cylindrical portion such that a straight line is set to the optical axis direction and which comes into contact with the spherical surface of the guide surface of the lens holding barrel and has at least three wedge portions on its outer peripheral surface;

a cylindrical supporting barrel which supports the lens holding barrel and has at least three second flange portions adapted to come into engagement with the first flange portions of the lens holding barrel and at least three wedge receiving portions which come into contact with the wedge portions of the intermediate ring, in which the lens holding barrel is moved in a direction perpendicular to the optical axis for eccentricity adjustment, in a state where the lens holding barrel is moved, the intermediate ring is moved on the guide surface of the lens holding barrel, and the wedge portions come into contact with the wedge receiving portions in this state, thereby fixing the lens holding barrel and the intermediate ring to the supporting barrel; and an adhesive portion at which contact portions of the lens holding barrel, the intermediate ring, and the supporting barrel are adhered with an adhesive agent.

The above and other objects and features of the present invention will become apparent from the following detailed description and the appended claims with reference to the accompanying drawings.

BRIEF DESCRIPTION OF THE DRAWINGS

FIG. 3A is a cross sectional view for explaining an eccentricity guide portion in the front barrel unit;

FIG. 3B is a cross sectional view for explaining a ring contact portion and a fixed ring; and FIGS. 4A, 4B, and 4C are diagrams for explaining an eccentricity adjustment in the front barrel unit.

DETAILED DESCRIPTION OF THE PREFERRED EMBODIMENT

An embodiment of the invention will be described hereinbelow.

Figure 1:
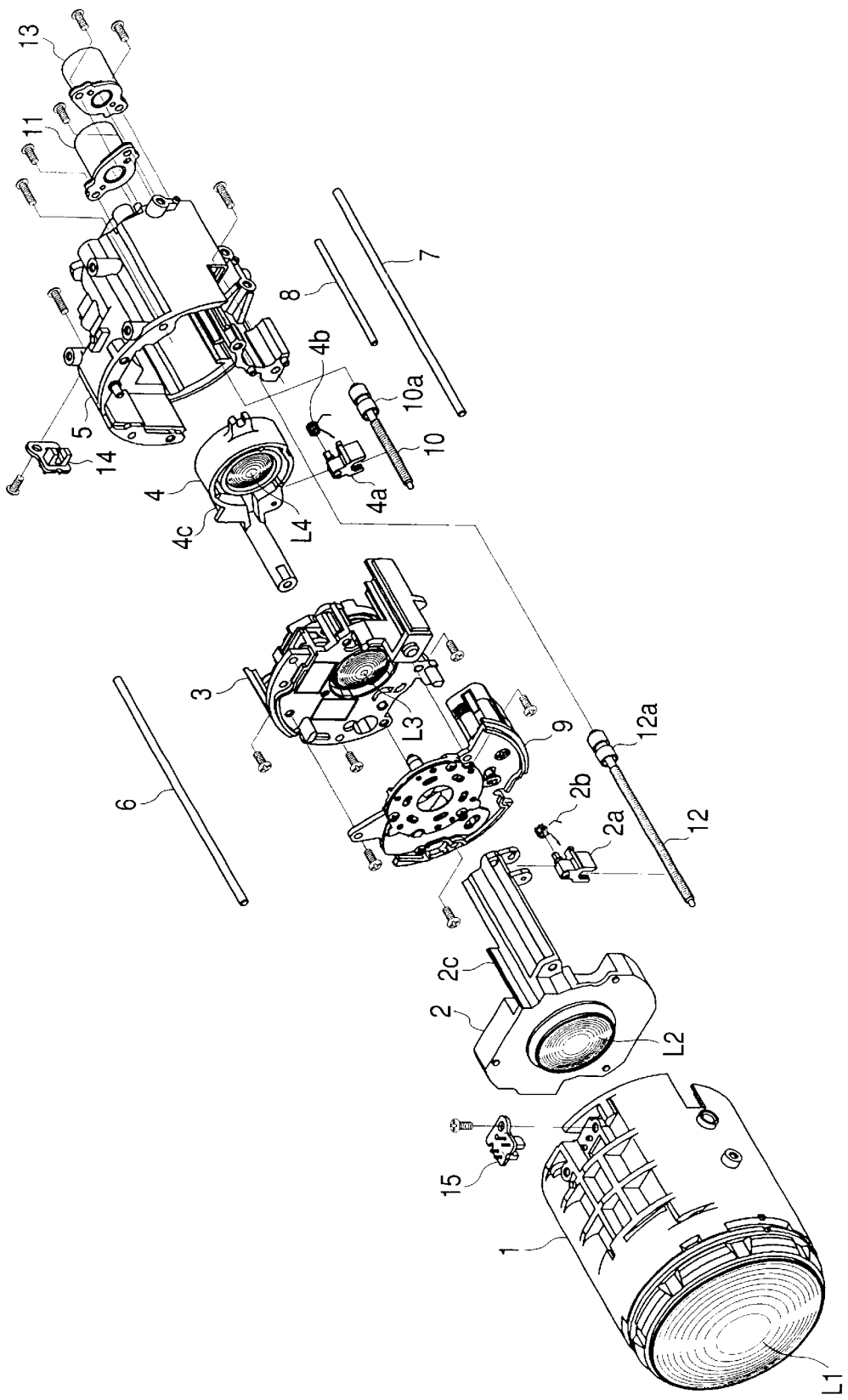
FIG. 1 is an exploded perspective view of a whole lens barrel as an embodiment of the invention.

FIG. 1 shows a construction of a lens barrel as an embodiment of the invention. The lens barrel is assembled into optical apparatuses such as photographing apparatuses like a video camera, a digital camera, and a film camera, observing apparatuses like a binocular and an astronomical telescope, and the like. The construction of an optical system of the lens barrel has a zoom optical system of four lens units sequentially having a convex lens unit, a concave lens unit, a convex lens unit, and a convex lens unit in order from an object (object to be photographed) side. The invention is not limited to the construction of this optical system but can be also applied to a zoom optical system with another construction or an optical system of a single focal point.

In FIG. 1, L1 denotes a first lens unit whose eccentricity is adjusted, L2 denotes a second lens unit for performing the zooming operation by moving in the optical axial direction, L3 denotes a third lens unit for performing what is called a blur (unintentional movement of a camera) correcting operation by moving in a plane perpendicular to the optical axis, and L4 denotes a fourth lens unit for performing a focusing operation by moving in the optical axial direction.

Reference numeral 1 denotes a front barrel unit for holding the first lens unit L1; 2 denotes a moving frame for holding the second lens unit L2; 3 denotes a shift unit for holding the third lens unit L3 so as to be movable in the plane perpendicular to the optical axis; 4 denotes a moving frame for holding the fourth lens unit L4; and 5 denotes a rear mirror barrel to which an image pickup device (not shown) such as a CCD or the like is attached.

Reference numerals 6 and 7 denote guide bars which are positioned and fixed by the front barrel unit 1 and rear mirror barrel 5. Reference numeral 8 denotes a guide bar which is positioned and fixed by the shift unit 3 and rear mirror barrel 5.

The moving frame 2 is supported by the guide bars 6 and 7 so as to be movable in the optical axial direction. The moving frame 4 is supported by the guide bars 6 and 8 so as to be movable in the optical axial direction. The shift unit 3 is positioned to the rear mirror barrel 5 and screwed and fixed from the front side with three screws.

Reference numeral 9 denotes an aperture apparatus for changing the diameter of an aperture of the optical system and is what is called an iris aperture for changing the opening diameter by moving six diaphragm blades. The aperture apparatus 9 is screwed and fixed to the shift unit 3 from the front side with three screws.

The rear mirror barrel 5 is positioned with respect to the front barrel unit 1 and thereafter screwed and fixed thereto from the rear side with three screws. Reference numeral 10 denotes a lead screw for the focusing operation executed by moving the fourth lens unit L4 in the optical axial direction. The lead screw 10 has bearing shapes in the front and rear portions and a rotor magnet 10$a$ polarized to multipoles is fixed to the rear portion.

Reference numeral 11 denotes a stepping motor stator unit for rotating the rotor magnet 10$a$. The lead screw 10 is supported by the shift unit 3 and a bearing portion provided on the stepping motor stator unit 11. The lead screw 10 is in engagement with a rack 4$a$ attached to the moving frame 4 and moves the fourth lens unit L4 by the rotation of the rotor magnet 10$a$. Rattles among the moving frame 4, the guide bars 6 and 8, the rack 4$a$, and the lead screw 10 are biased by an urging force of a helical coil spring 4$b$, respectively. Reference numeral 12 denotes a lead screw for the zooming operation executed by moving the second lens unit L2 in the optical axis direction. The lead screw 12 has bearing shapes in the front and rear portions and a rotor magnet 12$a$ polarized to multipoles is fixed to the rear portion.

Reference numeral 13 denotes a stepping motor stator unit for rotating the rotor magnet 12$a$. The lead screw 12 is supported by bearing portions provided on the shift unit 3 and stepping motor stator unit 13. The lead screw 12 is in engagement with a rack 2$a$ attached to the moving frame 2 and moves the second lens unit L2 by the rotation of the rotor magnet 12$a$.

Rattles among the moving frame 2, the guide bars 6 and 7, the rack 2$a$, and the lead screw 12 are biased by an urging force of a helical coil spring 2$b$, respectively.

Each of the stepping motor stator units 11 and 13 is fixed to the rear mirror barrel 5 with two screws.

Reference numeral 14 denotes a focus reset switch comprising a photo interrupter. When a light shielding portion 4c formed on the moving frame 4 is moved in the optical axis direction to be inserted into or removed from an optical path between a light emitting portion and a photosensing portion, the focus reset switch 14 optically detects it to generate an electrical signal, so that a control circuit (not shown) is allowed to discriminate whether the fourth lens unit L4 is positioned at a reference position or not. The focus reset switch 14 is fixed to the rear mirror barrel 5 with a screw through a board.

Reference numeral 15 denotes a zoom reset switch comprising a photo interrupter. When a light shielding portion 2c formed on the moving frame 2 is moved in the optical axis direction to be inserted into or removed from an optical path between a light emitting portion and a photosensing portion, the zoom reset switch 15 optically detects it to generate an electrical signal, so that the control circuit (not shown) is allowed to discriminate whether the second lens unit L2 is positioned at a reference position or not. The zoom reset switch 15 is fixed to the front barrel unit 1 with the screw through the board.

Figure 2:
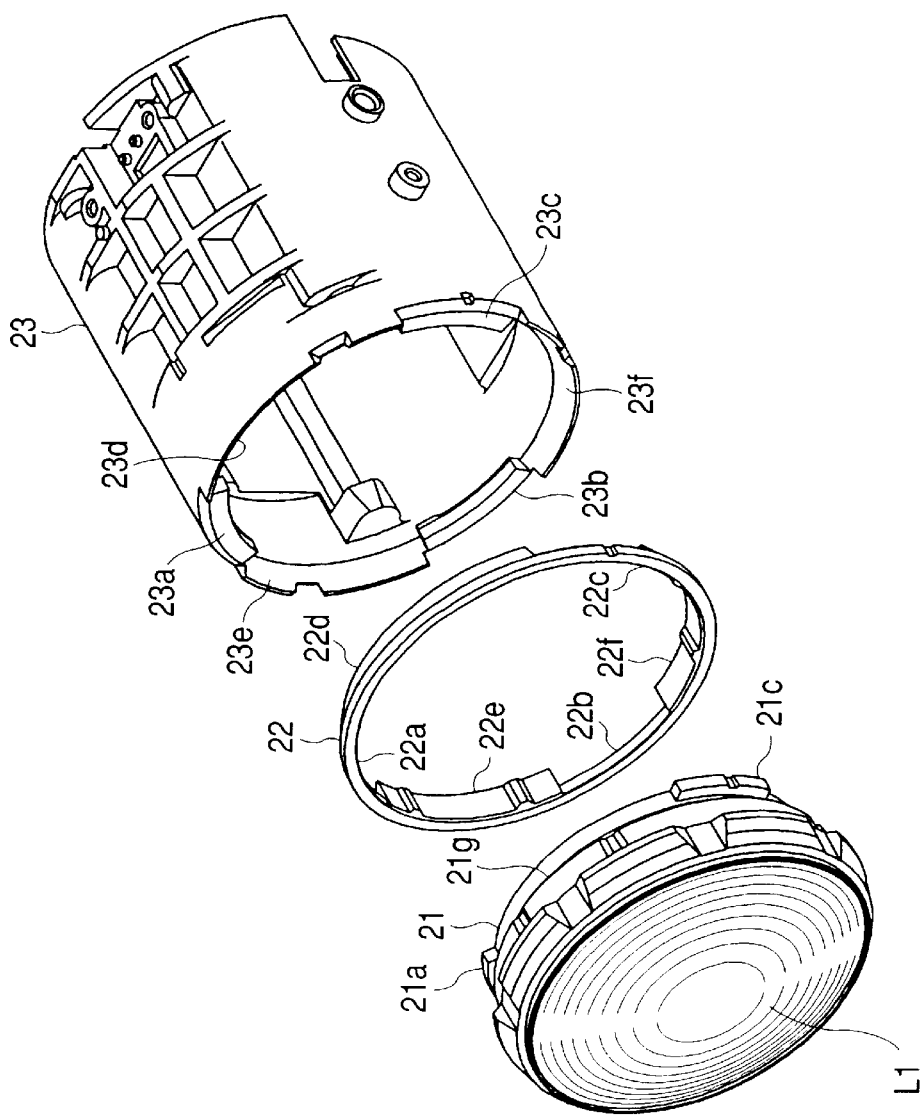
FIG. 2 is an exploded perspective view of a front barrel unit of the lens barrel.

FIG. 2 illustrates an exploded view of the front barrel unit 1. Reference numeral 21 denotes a front barrel (lens holding barrel) which holds the first lens unit whose eccentricity is adjusted; 22 denotes a ring (intermediate ring); and 23 denotes a fixed barrel (supporting barrel). Subsequently, the shapes and relations of the parts constructing the front barrel unit will be described with reference also to FIGS. 3A and 3B. FIGS. 3A and 3B are diagrams showing a state where an eccentricity of the front barrel 21 that holds the first lens unit L1 is adjusted so that the front barrel 21 is almost coaxial with respect to the fixed barrel 23 and, thereafter, the barrel 21 is positioned by the ring 22.

In FIGS. 2, 3A, and 3B, reference numerals 23a, 23b, and 23c denote flange portions provided at three positions in the peripheral direction of the front edge portion of the fixed barrel 23, and reference numerals 21a, 21b (not shown), and 21c denote flange portions provided at three positions in the peripheral direction of the rear edge portion of the front barrel 21, respectively.

FIG. 3A is a cross sectional view of the portion corresponding to the flange portion 23a (23b, 23c). The flange portions 23a, 23b, and 23c on the fixed barrel 23 side are inserted into gaps among the flange portions 21a, 21b, and 21c on the front barrel 21 side and a surface 21g, thereby enabling the front barrel 21 to be moved for eccentric adjustment relative to the fixed barrel 23 in a direction perpendicular to the optical axis by a distance corresponding to a space t in a direction perpendicular to the optical axis. The front barrel 21, which is a lens holding barrel, can be moved in all directions within a plane perpendicular to the optical axis for eccentricity adjustment relative to the fixed barrel 23 which is a supporting barrel.

A slight gap for allowing the eccentricity adjustment movement of the front barrel 21 is provided between each of the flange portions 23a, 23b, and 23c on the fixed barrel 23 side and a space defined by each of the flange portions 21a, 21b, and 21c and the surface 21g on the front barrel 21 side. Upon eccentricity adjustment, as will be explained hereinlater, by making the surface 21g of the front barrel 21 come into contact with (biasing to) the flange portions 23a, 23b, and 23c of the fixed barrel 23, the movement in the optical axial direction of the front barrel 21 relative to the fixed barrel 23 is prevented. Namely, in this state, the front barrel 21 can be moved for eccentricity adjustment relative to the fixed barrel 23 in a state in which positioning of the front barrel 21 with respect to the fixed barrel 23 in the optical axis direction is mechanically effected.

FIG. 3B is a cross sectional view corresponding to the portion having a wedge-shaped cross section in the ring 22. Reference numerals 22d, 22e, and 22f denote portions-having wedge-shaped cross sections (hereinafter, referred to as wedge-shaped portions) formed at three positions in the peripheral direction on the ring 22. A bore surface of the ring 22 also serves as a cylindrical surface.

Cross sectional shapes of the wedge-shaped portions 22d, 22e, and 22f are formed so that a thickness in the radial direction on the rear side in the axial direction of the ring 22 becomes thinner than that on the front side. Further, outer diameter surfaces of the wedge-shaped portions 22d, 22e, and 22f are so configured as to be to convex spherical surfaces which are approximated to loci of the outer surfaces of the wedge-shaped portions when the ring 22 is moved along the convex spherical surface of a receiving surface 21h, which will be explained hereinlater, of the front barrel 21.

The wedge-shaped portions 22d, 22e, and 22f are coupled in the peripheral direction by coupling portions 22a, 22b, and 22c each having a rectangular cross section, respectively. The ring 22 has an integral ring shape entirely. The ring 22 can be elastically deformed in the coupling portions 22a, 22b, and 22c.

Reference numerals 23d, 23e, and 23f denote receiving surfaces formed at the tip of the fixed barrel 23 in order to receive the wedge-shaped portions 22d, 22e, and 22f of the ring 22. The receiving surfaces 23d, 23e, and 23f are so configured as to be concave spherical surfaces corresponding to the convex spherical surfaces as outer diameter surfaces of the wedge-shaped portions 22d, 22e, and 22f. Reference numeral 21h denotes the receiving surface which is formed on the outer periphery of the front barrel 21 and used for receiving the bore surfaces of the wedge shaped portions 22d, 22e, and 22f of the ring 22. The receiving surface 21h is formed like a convex spherical surface of a radius R1 about a point 21i on the optical axis of the mirror barrel as a center. The bore surface of the ring 22 is a cylindrical surface, which is parallel with the optical axis.

Therefore, as for the ring 22, even in a state where the ring 22 is inclined with respect to a direction perpendicular to the optical axis with the point 21i as a center substantilly, parts of the cylindrical surfaces of the bore surfaces of the wedge-shaped portions 22d, 22e, and 22f can come into contact with the receiving surface 21h of the convex spherical surface, and the outer diameter surfaces of the wedge-shaped portions 22d, 22e, and 22f can stably come into contact with the receiving surfaces 23d, 23e, and 23f of the fixed barrel 23, respectively.

Therefore, even if a gap (a gap in a direction perpendicular to the optical axis) between the receiving surface 21h of the front barrel 21 and each of the receiving surfaces 23d, 23e, and 23f of the fixed barrel 23 is varied in the peripheral direction by moving the front barrel 21 relative to the fixed barrel 23 for eccentricity-adjustment, both the bore surface and the outer diameter surface of the ring 22 can surely abut against the receiving surface 21h, and the receiving surfaces 23d, 23e, and 23f, respectively, by causing the ring 22 to be inclined, so that the front barrel 21 can be mechanically positioned relative to the fixed barrel 23 in the eccentricity adjusting direction (the direction perpendicular to the optical axis).

The receiving surface 21h of the front barrel 21 and the receiving surfaces 23d, 23e, and 23f of the fixed barrel 23 are provided on substantially the same planes perpendicular to the optical axis on the front barrel 21 and fixed barrel 23. The receiving surfaces 23*d*, 23*e*, and 23*f* of the fixed barrel 23 are alternately arranged in the peripheral direction.

Consequently, an arrangement space of the eccentricity adjusting mechanism in the optical axial direction can be reduced.

Functions of the eccentricity adjusting mechanism will now be described with reference to FIGS. 4A to 4C.

First, FIG. 4A is a cross sectional view corresponding to FIG. 3B upon eccentricity adjustment. In a state shown in the diagrams, the ring 22 is shifted to the front side on the receiving surface 21*h* of the front barrel 21 in the optical axial direction, thereby enabling the eccentricity adjustment of the front barrel 21 to be effected with respect to the fixed barrel 23 by an amount of a gap 24.

Tool receiving surfaces 21*j*, which are inclined from the optical axis, are formed at four positions in the peripheral direction on the front edge side of the outer periphery of the front barrel 21.

Reference numeral 25 denotes an externally attached adjusting tool for moving the front barrel 21 for eccentricity adjustment. The tool 25 is constructed by: a main body portion (not shown) that is fixed to the outer periphery of the fixed barrel 23; two urging pins extending toward the optical axis from two directions perpendicular to each other on the plane perpendicular to the optical axis outside of the front barrel 21; and two micrometer heads extending toward the optical axis from the directions respectively opposite to which face the urging pins.

By making the urging pins and the micrometer heads of the adjusting tool 25 abut against the tool receiving surfaces 21*j* and expanding or contracting the micrometer heads, the front barrel 21 can be moved for eccentricity adjustment respectively to the fixed barrel 23.

A tip of the adjusting tool 25 has a semispherical shape. By making the semispherical tip abut against the tool receiving surface 21*j* inclined from the optical axis, the eccentricity adjustment can be made while making the surface 21*g* of the front barrel 21 come into pressure contact with (biasing to) the surfaces at the front side of the flange portions 23*a*, 23*b*, and 23*c* of the fixed barrel 23. As a result, the more accurate eccentricity adjustment can be made.

FIGS. 4B and 4C show a state where after the front barrel 21 is decentered downward and upward in the diagram by a distance x, respectively, the ring 22 is pushed backward in the optical axis direction while being inclined to abut the point 21*i* as substantially a center by using another tool different from the adjusting tool 25 from the front side of the front barrel 21 so that the ring 22 is moved to the fixed position where the bore surface and the outer diameter surface of the ring 22 abut against the receiving surfaces 21*h* and 23*d* respectively.

In FIG. 4B, since the front barrel 21 is decentered downward, an upper one of the gaps between the receiving surfaces of the front barrel 21 and the fixed barrel 23 is wider than the lower gap. Therefore, the upper wedge-shaped portion of the ring 22 is inserted into the more backward position than the position shown in FIG. 4C. Although FIGS. 4B and 4C show only the upper side from the optical axis, FIG. 4C also corresponds to a cross section on the opposite side (lower side) with respect to the optical axis in FIG. 4B. That is, after the eccentricity adjustment of the front barrel 21 to the fixed barrel 23, by inserting the ring 22 inclined about the point 21*i* as substantially a center so as to be fitted into a gap between the receiving surfaces 21*h* and 23*d*, the front barrel 21 can be positioned with respect to the fixed barrel 23 in the eccentricity adjusting direction without any gap. In this state, the front barrel 21 is fixed to the fixed barrel 23 in the eccentricity adjusted state.

In the above embodiment, after the front barrel 21 was fixed to the fixed barrel 23 in the eccentricity adjusted state by using the ring 22, in order to further enhance the fixing state, fixing means such as adhesion or melt-bonding means may be used as explained hereinbelow.

That is, in a state where the front barrel 21 has been eccentricity adjusted, the ring 22 is fitted into the gap between the receiving surface 21*h* of the front barrel 21 and the receiving surface 23*d* of the fixed barrel 23. After that, adhesive portions at which the contact portions of the front barrel 21, ring 22, and fixed barrel 23 are adhered with an adhesive agent are formed to be fixed, or melt-bonding portions at which the contact portions of the front barrel 21, ring 22, and fixed barrel 23 are melted and bonded are formed to be fixed. By fixing them by the adhesive portions or melt-bonding portions, the lens position in which the eccentricity adjustment has been completed can be rigidly held against any external conditions.

Particularly, if each part is made of plastics, the parts can be perfectly integrated owing to the foregoing melt-bonding and the reliability can be further raised.

The structure and shape of each part described in the embodiment are merely shown as examples. The invention can be also applied to other structures and shapes so long as they can accomplish the functions and effects of the invention.

According to the invention as described above, in a state where the front barrel as a lens holding barrel is moved in a direction perpendicular to the optical axis for thereby being eccentricity-adjusted, the ring as an intermediate ring is fixed to the fixed barrel as a supporting barrel, thereby enabling the lens holding barrel to be mechanically positioned and fixed to the supporting barrel.

The lens holding barrel can be adhered or melt bonded and fixed to the supporting barrel while the eccentricity adjusting state is maintained. Thus, a lens barrel whose eccentricity adjusting state is hardly deformed due to a shock, environmental change, or the like after completion of the fixing by the adhesion or melt-bonding can be realized.

If the tool receiving surfaces which are formed so as to be inclined from the optical axial direction and used for generating a force sufficient to press the lens holding barrel toward the supporting barrel side in the optical axis direction when the tool for eccentricity adjustment is pressed are formed on the outer periphery of the lens holding barrel, the rattles in the flange portions in the optical axis direction can be prevented during the eccentricity adjustment, and a more accurate eccentricity adjustment can be made.

What is claimed is:

1. A lens barrel comprising:
   a lens holding barrel that holds a lens, said lens holding barrel having a first flange portion for preventing movement of said lens in the direction of an optical axis and permitting movement of said lens in a direction perpendicular to the optical axis and a ring-shaped guide surface;
   an intermediate ring movably provided on said guide surface of said lens holding barrel, said intermediate ring having a wedge portion; and
   a supporting barrel for supporting the lens holding barrel, said supporting barrel having a second flange portion adapted to come into engagement with said first flange portion of said lens holding barrel and a wedge receiving portion which comes into contact with said wedge portion of said intermediate ring, said lens holding barrel being moved in a direction perpendicular to the optical axis for eccentricity adjustment, in a state where said lens holding barrel is moved, said intermediate ring being moved on said guide surface of said lens holding barrel, and said wedge portion coming into contact with said wedge receiving portion in this state, thereby fixing said lens holding barrel and said intermediate ring to said supporting barrel.

2. A lens barrel according to claim 1, wherein the surface of said guide surface of said lens holding barrel has a spherical shape formed with a radius R about said optical axis as a center, and an inner peripheral surface of said intermediate ring which comes into contact with said spherical surface of said guide surface has a cylindrical portion that is parallel with the optical axis.

3. A lens barrel comprising:

a lens holding barrel that holds a lens, said lens holding barrel having a first flange portion for preventing movement of said lens in the direction of an optical axis and permitting movement of said lens in a direction perpendicular to the optical axis and a ring shaped guide surface;

an intermediate ring movably provided on said guide surface of said lens holding barrel, said intermediate ring having a wedge portion;

a supporting barrel for supporting the lens holding barrel, said supporting barrel having a second flange portion adapted to coming into contact with said wedge portion of said intermediate ring, said lens holding barrel being moved in the direction perpendicular to the optical axis for eccentricity adjustment, in a state where said lens holding barrel is moved, said intermediate ring being moved on said guide surface of said lens holding barrel, and said wedge portion coming into contact with said wedge receiving portion in this state, thereby fixing said lens holding barrel and said intermediate ring to said supporting barrel; and fixing means for fixing said lens holding barrel, said intermediate ring, and said supporting barrel.

4. A lens barrel according to claim 3, wherein said guide surface of said lens holding barrel has a spherical shape formed with a radius R about the optical axis as a center, and an inner peripheral surface of said intermediate ring which comes into contact with said spherical surface of said guide surface has a cylindrical portion that is parallel with the optical axis.

5. A lens barrel according to claim 3, wherein said fixing means is an adhesive portion at which contact portions of said lens holding barrel, said intermediate ring, and said supporting barrel are adhered with an adhesive agent.

6. A lens barrel according to claim 3, wherein said fixing means is a melt-bonding portion at which contact portions of said lens holding barrel, said intermediate ring, and said supporting barrel are melted and bounded.

7. A lens barrel comprising:

a lens holding barrel having a cylindrical shape for holding a lens, said lens holding barrel having at least three first flange portions for preventing movement of said lens in the direction of an optical axis and permitting movement of said lens in a direction perpendicular to the optical axis and a ring-shaped guide surface having a spherical surface;

an intermediate ring that is movably provided along said spherical surface of said guide surface of said lens holding barrel so that it can be freely inclined in said optical axial direction and to said optical axis, said intermediate ring having, on its inner peripheral surface, a cylindrical portion such that a straight line is set to the optical axis direction and which comes into contact with said spherical surface of said guide surface of said lens holding barrel and having at least three wedge portions on its outer peripheral surface;

a cylindrical supporting barrel for supporting said lens holding barrel, said supporting barrel having at least three second flange portions adapted to come into engagement with said first flange portions of said lens holding barrel and at least three wedge receiving portions which come into contact with said wedge portions of said intermediate ring, said lens holding barrel being moved in the direction perpendicular to the optical axis for eccentricity adjustment, in a state where said lens holding barrel is moved, said intermediate ring being moved on said guide surface of said lens holding barrel, and said wedge portions coming into contact with said wedge receiving portions in this state, thereby fixing said lens holding barrel and said intermediate ring to said supporting barrel; and an adhesive portion at which contact portions of said lens holding barrel, said intermediate ring, and said supporting barrel are adhered with an adhesive agent.

8. An optical apparatus having a lens barrel, comprising:

a lens holding barrel which holds a lens, said lens holding barrel having a first flange portion for preventing movement of said lens in the direction of an optical axis and permitting movement of said lens in a direction perpendicular to the optical axis and a ring shaped guide surface;

an intermediate ring movably provided on said guide surface of said lens holding barrel, said intermediate ring having a wedge portion; and a supporting barrel for supporting the lens holding barrel, said supporting barrel having a second flange portion adapted to come into engagement with said first flange portion of said lens holding barrel and a wedge receiving portion which comes into contact with said wedge portion of said intermediate ring, said lens holding barrel being moved in the direction perpendicular to the optical axis for eccentricity adjustment, in a state where said lens holding barrel is moved, said intermediate ring being moved on said guide surface of said lens holding barrel, and said wedge portion coming into contact with said wedge receiving portion in this state, thereby fixing said lens holding barrel and said intermediate ring to said supporting barrel.

9. An apparatus according to claim 8, wherein the surface of said guide surface of said lens holding barrel has a spherical shape formed with a radius R about said optical axis as a center, and an inner peripheral surface of said intermediate ring which comes into contact with said spherical surface of said guide surface has a cylindrical portion that is parallel with the optical axis.

10. An optical apparatus having a lens barrel, comprising:

a lens holding barrel that holds a lens, said lens holding barrel having a first flange portion for preventing movement of said lens in the direction of an optical axis and permitting movement of said lens in a direction perpendicular to the optical axis and a ring shaped guide surface;

an intermediate ring movably provided on said guide surface of said lens holding barrel, said intermediate ring having a wedge portion;

a supporting barrel for supporting the lens holding barrel, said supporting barrel having a second flange portion adapted to come into engagement with said first flange portion of said lens holding barrel and a wedge receiving portion which comes into contact with said wedge portion of said intermediate ring, said lens holding barrel being moved in the direction perpendicular to the optical axis for eccentricity adjustment, in a state where said lens holding barrel is moved, said intermediate ring being moved on said guide surface of said lens holding barrel, and said wedge portion coming into contact with said wedge receiving portion in this state, thereby fixing said lens holding barrel and said intermediate ring to said supporting barrel; and fixing means for fixing said lens holding barrel, said intermediate ring, and said supporting barrel.

11. An apparatus according to claim 10, wherein said guide surface of said lens holding barrel has a spherical shape formed with a radius R about the optical axis as a center, and an inner peripheral surface of said intermediate ring which comes into contact with said spherical surface of said guide surface has a cylindrical portion that is parallel with the optical axis.

12. An apparatus according to claim 10, wherein said fixing means is an adhesive portion at which contact portions of said lens holding barrel, said intermediate ring, and said supporting barrel are adhered with an adhesive agent.

13. An apparatus according to claim 10, wherein said fixing means is a melt-bonding portion at which contact portions of said lens holding barrel, said intermediate ring, and said supporting barrel are melted and bounded.

14. An optical apparatus having a lens barrel, comprising:

a lens holding barrel having a cylindrical shape for holding a lens, said lens holding barrel having at least three first flange portions for preventing movement of said lens in the direction of an optical axis and permitting movement of said lens in a direction perpendicular to the optical axis and a fringe-shaped guide surface having a spherical surface;

an intermediate ring that is movably provided along said spherical surface of said guide surface of said lens holding barrel so that it can be freely inclined in said optical axial direction and to said optical axis, said intermediate ring having, on its inner peripheral surface, a cylindrical portion that is parallel with the optical axis and which comes into contact with said spherical surface of said guide surface of said lens holding barrel and having at least three wedge portions on its outer peripheral surface;

a cylindrical supporting barrel for supporting said lens holding barrel, said supporting barrel having at least three second flange portions adapted to come into engagement with said first flange portions of said lens holding barrel and at least three wedge receiving portions which come into contact with said wedge portions of said intermediate ring, said lens holding barrel being moved in the direction perpendicular to the optical axis for eccentricity adjustment, in a state where said lens holding barrel is moved, said intermediate ring being moved on said guide surface of said lens holding barrel, and said wedge portions coming into contact with said wedge receiving portions in this state, thereby fixing said lens holding barrel and said intermediate ring to said supporting barrel; and an adhesive portion at which contact portions of said lens holding barrel, said intermediate ring, and said supporting barrel are adhered with an adhesive agent.

* * * * *

UNITED STATES PATENT AND TRADEMARK OFFICE
CERTIFICATE OF CORRECTION

PATENT NO.    : 6,515,807 B2
DATED         : February 4, 2003
INVENTOR(S)   : Kazuhiro Noguchi It is certified that error appears in the above-identified patent and that said Letters Patent is hereby corrected as shown below:

Column 2,
Line 22, "to be" should read -- to --.
Line 46, "to be" should read -- to --.

Column 4,
Line 50, "Reference" should begin a new paragraph.

Column 6,
Line 6, "portions-" should read -- portions --.
Line 44, "substantilly" should read -- substantially --.

Signed and Sealed this

Sixteenth Day of September, 2003

JAMES E. ROGAN
*Director of the United States Patent and Trademark Office*